(12) United States Patent
Lehman et al.

(10) Patent No.: US 8,888,625 B2
(45) Date of Patent: Nov. 18, 2014

(54) QUICK RELEASE TENSIONER

(75) Inventors: Benjamin Lehman, Deer Park, WI (US); Christopher M. Schloesser, Hudson, WI (US)

(73) Assignee: Oxbo International Corporation, Byron, NY (US)

( * ) Notice: Subject to any disclaimer, the term of this patent is extended or adjusted under 35 U.S.C. 154(b) by 228 days.

(21) Appl. No.: 13/247,893

(22) Filed: Sep. 28, 2011

(65) Prior Publication Data

US 2012/0196710 A1     Aug. 2, 2012

Related U.S. Application Data

(60) Provisional application No. 61/387,304, filed on Sep. 28, 2010.

(51) Int. Cl.
| F16H 7/14 | (2006.01) |
| F16H 7/22 | (2006.01) |
| A01D 45/02 | (2006.01) |
| F16H 7/12 | (2006.01) |
| F16H 7/08 | (2006.01) |

(52) U.S. Cl.
CPC ...... F16H 7/1263 (2013.01); *F16H 2007/0878* (2013.01); *F16H 2007/087* (2013.01); *A01D 45/023* (2013.01); *F16H 2007/0808* (2013.01); *F16H 2007/0891* (2013.01); *F16H 2007/088* (2013.01); *F16H 2007/0806* (2013.01)
USPC .......................................... 474/117; 474/119

(58) Field of Classification Search
USPC .................... 474/113, 119, 122, 126; 54/11.6
See application file for complete search history.

(56) References Cited

U.S. PATENT DOCUMENTS

| 65,304 | A | * | 5/1867 | Tilton | 474/122 |
| 367,891 | A | * | 8/1887 | Canning | 474/119 |
| 675,196 | A | | 5/1901 | Colahan | |
| 683,968 | A | * | 10/1901 | Moskowitz | 474/110 |
| 687,252 | A | * | 11/1901 | Moran | 474/113 |
| 732,238 | A | * | 6/1903 | Turbayne | 322/43 |
| 734,247 | A | * | 7/1903 | Talley | 474/113 |
| 734,643 | A | * | 7/1903 | Whitney | 451/178 |
| 820,102 | A | * | 5/1906 | Duer | 192/219 |
| 907,289 | A | * | 12/1908 | Robinson | 474/69 |
| 1,006,529 | A | * | 10/1911 | Brown | 474/113 |
| 1,394,100 | A | * | 10/1921 | Leinbrock | 474/113 |
| 1,430,305 | A | * | 9/1922 | Eucken | 474/89 |
| 1,476,450 | A | * | 12/1923 | Lee | 474/115 |
| 1,913,040 | A | * | 6/1933 | Pierson | 474/113 |
| 2,066,174 | A | * | 12/1936 | Cregier | 56/11.6 |
| 2,257,796 | A | * | 10/1941 | Heineke | 474/113 |
| 2,292,580 | A | * | 8/1942 | Moyer et al. | 56/11.6 |

(Continued)

OTHER PUBLICATIONS

European Search Report for 11183120.2 mailed Feb. 6, 2013.

*Primary Examiner* — Henry Liu
(74) *Attorney, Agent, or Firm* — Merchant & Gould P.C.

(57) ABSTRACT

A tensioner includes a base and an idler support assembly slidably retained on the base, the idler support assembly including a support element having a cam surface at a first end. A spring loaded handle assembly includes a tension bar rotatably mounted to the base, and a handle longitudinally adjustably mounted to the tension bar, an engagement element, and a biasing element intermediate the engagement element and the handle. The handle is assembly rotatable between a first position and a second position. The engagement element disengages the cam surface in the first position and the engagement element engages the cam surface in the second position.

13 Claims, 18 Drawing Sheets

(56) References Cited

U.S. PATENT DOCUMENTS

| | | | |
|---|---|---|---|
| 2,398,300 A * | 4/1946 | Frazier | 474/89 |
| 2,413,265 A * | 12/1946 | Thompson | 198/814 |
| 2,458,255 A * | 1/1949 | Couse | 474/113 |
| 2,464,175 A * | 3/1949 | Edwin | 474/113 |
| 2,523,166 A * | 9/1950 | Tom | 56/11.6 |
| 2,578,694 A * | 12/1951 | Goldman | 310/91 |
| 2,618,163 A * | 11/1952 | Russel | 474/113 |
| 2,666,333 A * | 1/1954 | Geyer | 474/109 |
| 2,791,079 A * | 5/1957 | Funk | 56/11.6 |
| 2,855,742 A * | 10/1958 | Cooper | 56/11.6 |
| 2,856,785 A * | 10/1958 | Steele | 474/113 |
| 2,953,241 A * | 9/1960 | Lehman | 198/816 |
| 3,038,288 A * | 6/1962 | Deptula et al. | 56/11.6 |
| 3,079,743 A * | 3/1963 | Egley | 56/11.6 |
| 3,628,315 A * | 12/1971 | Bartholomew | 56/10.5 |
| 3,641,830 A * | 2/1972 | Stofer | 474/122 |
| 3,699,751 A * | 10/1972 | Ross et al. | 56/10.3 |
| 3,893,240 A * | 7/1975 | Morner et al. | 30/390 |
| 3,921,793 A * | 11/1975 | Hutchinson et al. | 198/813 |
| 4,036,070 A * | 7/1977 | Knight | 474/119 |
| 4,307,558 A * | 12/1981 | Bent et al. | 56/11.3 |
| 4,317,325 A * | 3/1982 | Marto | 56/11.6 |
| 4,361,960 A * | 12/1982 | Halverson | 30/385 |
| 4,421,228 A * | 12/1983 | Marsiglio et al. | 198/814 |
| 4,571,221 A * | 2/1986 | Isobe et al. | 474/101 |
| 4,583,961 A * | 4/1986 | Kawasawa et al. | 474/113 |
| 4,678,354 A * | 7/1987 | Olsen | 400/335 |
| 4,761,154 A * | 8/1988 | Beauchamp et al. | 474/101 |
| 4,803,804 A * | 2/1989 | Bryant | 474/113 |
| 4,883,445 A * | 11/1989 | Gomoll et al. | 474/113 |
| 4,977,708 A * | 12/1990 | Kloft | 451/359 |
| 4,983,146 A * | 1/1991 | Charles et al. | 474/117 |
| 5,174,029 A * | 12/1992 | Talberg | 30/386 |
| 5,177,871 A * | 1/1993 | Martenson | 30/122 |
| 5,199,502 A * | 4/1993 | Hirata et al. | 172/15 |
| 5,533,585 A * | 7/1996 | Kawano et al. | 180/190 |
| 5,557,912 A | 9/1996 | Voss et al. | |
| 5,941,056 A * | 8/1999 | Lehman | 56/11.6 |
| 5,947,263 A * | 9/1999 | Uber et al. | 198/813 |
| 6,167,686 B1 | 1/2001 | Becker et al. | |
| 6,334,292 B1 * | 1/2002 | Walch et al. | 56/11.6 |
| 6,398,681 B1 * | 6/2002 | Wanie | 474/101 |
| 7,101,295 B2 * | 9/2006 | Taomo et al. | 474/117 |
| 7,181,845 B2 * | 2/2007 | Roessler et al. | 29/895.33 |
| 2004/0033852 A1 * | 2/2004 | Taomo et al. | 474/101 |
| 2007/0066429 A1 * | 3/2007 | Seki et al. | 474/112 |
| 2007/0125055 A1 * | 6/2007 | Ducoulombier et al. | 56/11.6 |

* cited by examiner

QUICK RELEASE TENSIONER

BACKGROUND OF THE INVENTION

1. Field of the Invention

The present invention relates to a quick release tensioner system for adjusting the position of an idler to tension loops, such as belts and chains.

2. Description of the Prior Art

Harvesters, such as corn combines, typically have a crop cutting and gathering system that removes a portion of the crop for subsequent processing by the harvester. Corn is typically harvested with sets of snapping rollers to remove ears of corn and opposed gathering chains to move the ears rearward.

In order to efficiently operate and to ensure that the ears of corn are properly separated from the stalks, the gathering chains must operate efficiently. It can be appreciated that as with many devices using chains or belts, the tension on the chain or belt must be properly maintained. However, due to stretching of the chain or belt and/or wear or slippage of idlers, the tension on the belt may not be maintained at a desired level.

To maintain belt or chain tension, tensioners have been used, such as shown in U.S. Pat. Nos. 5,557,912 and 6,167,686. However, restoring proper tension to a chain may often require removal of the chain and time consuming and labor intensive adjustment of complicated mechanisms. Moreover, the systems do not use a quick release system and may require special tools.

To overcome problems associated with providing proper tension, it is desirable that a tension device be a quick release type device that may be manually actuated to release the tension on the chain while adjustments may be quickly made to properly position the components to restore tension to the chain or belt. Moreover, such a device should be easily and safely accessible and should provide for quickly and easily decreasing or increasing the tension to obtain proper tension. Such a system should also ensure that the tension device remains locked so that loosening due to inadvertent slippage or rotation is prevented. The present invention addresses these as well as other problems associated with tensioning systems.

SUMMARY OF THE INVENTION

The present invention is directed to a quick release tensioning system for loops, such as belts or chains. The tensioning assembly includes an idler configured for engaging a belt, chain or other loop type element passing around an idler that may be tensioned. The position of the tensioning idler may be changed by adjusting a rotatable spring handle assembly. An idler support is slidably retained on a base. One end of the idler support extends from the base in a first direction and includes the idler. A second end of the idler support includes a cam. A rotatable handle assembly pivotally mounts to the base and includes a washer engaging the cam surface. The cam generally extends in an arc with a center roughly along an axis of rotation for the handle with a radius widening from an upper position to a lower end. The handle assembly includes a pivot that rotates relative to the base and has a tension rod that extends outward from the pivot axis and rotates in a plane between vertical portions of the cam element. The tension bar threadably engages a handle. A helical spring extends around the tension bar within the interior of the handle and presses against a washer. The washer is retained in an unengaged position by a step on the tension bar and is engaged by the end of the handle in an engaged position. The washer slides along the surface of the cam of the idler support assembly. Tension may be increased or decreased by changing the position of the washer along the tension bar. As the spring engaging the washer is engaged by the upper inner end of the handle, the position of the washer relative to the tension bar is changed by rotating the handle to move the handle upward or downward along the length of the threaded portion of the tension bar. The lower end of the handle also acts as a travel limiter for the washer. As the washer cannot move past the lower end of the handle, the spring cannot be compressed to a length less than the extent of the interior of the handle so that the spring cannot be compressed beyond a minimum length.

To apply tension to the chain or belt, the idler is placed in a position with the chain or belt looped around the idler. The handle is then pivoted downward so that the washer presses against the surface of the cam and extends the idler support and therefore the idler extends further from the base to increase tension. If the tension is too great or too little, the handle may be rotated in one direction or the other to move the handle upward or downward along the shaft of the tension bar. As the handle acts as the travel limiter for the washer, the axial movement of the handle changes the position of the engaged washer relative to the pivot portion of the spring handle assembly, but the spring still maintains a constant force when the spring handle assembly is in the locked position.

The spring handle assembly is locked in position by having the handle pass through a toggle point slightly over center and extending downward beyond an engagement surface of the base and the idler support. In addition, the base includes a tab projecting outward that is aligned with one of several notches positioned about a periphery of the handle. Engagement between the tab and one of the notches prevents rotation of the handle when the handle assembly is pivoted to a fully engaged position. The spring constant is sufficiently high to maintain constant pressure against the washer and prevent the assembly from releasing. However, the tensioning system may be easily disengaged by lifting handle upward to a position wherein the washer is disengaged from the cam.

In another embodiment, the cam includes two planar vertical elements having a shoulder and forming a recess. The recess extends approximately 3 degrees beyond a direction perpendicular to the bearing surface of the base. A complementary locking member includes a washer body having an orifice through which the shaft of the tension bar (34) extends to allow the locking member to move axially along the tension bar. The locking member includes a tab extending from the washer body at a slight angle to the washer body. The washer body has side by side slots configured for engaging the shoulders in a locked position.

When the handle assembly is moved to the locked position the washer body slides over the shoulder and into the recess. The shoulder of each cam member protrudes into the corresponding slot in the washer body. At this position, the locking member cannot move out of the recess as the washer body is biased against the surface of the recess and the shoulder engages the slot. The recess extends slightly beyond the direction perpendicular to the slide bearing forming a toggle in addition to the positive lock from each shoulder engaging the complementary slot.

To release the locking member, the tab is manually pushed away from the cam. This action raises the washer body away from the recess so that the slots disengage from the associated shoulders. With the tab held at this position, the handle assembly may be rotated from the locked position and the washer body slides over the shoulders. The cam and locking member provide a secure system to prevent accidentally loosening of the tensioning system and with tab of the base engaging the notches in the handle, independent duplicate locking is achieved.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference numerals and letters indicate corresponding structure throughout the several views.

DETAILED DESCRIPTION OF THE PREFERRED EMBODIMENT

Figure 1:
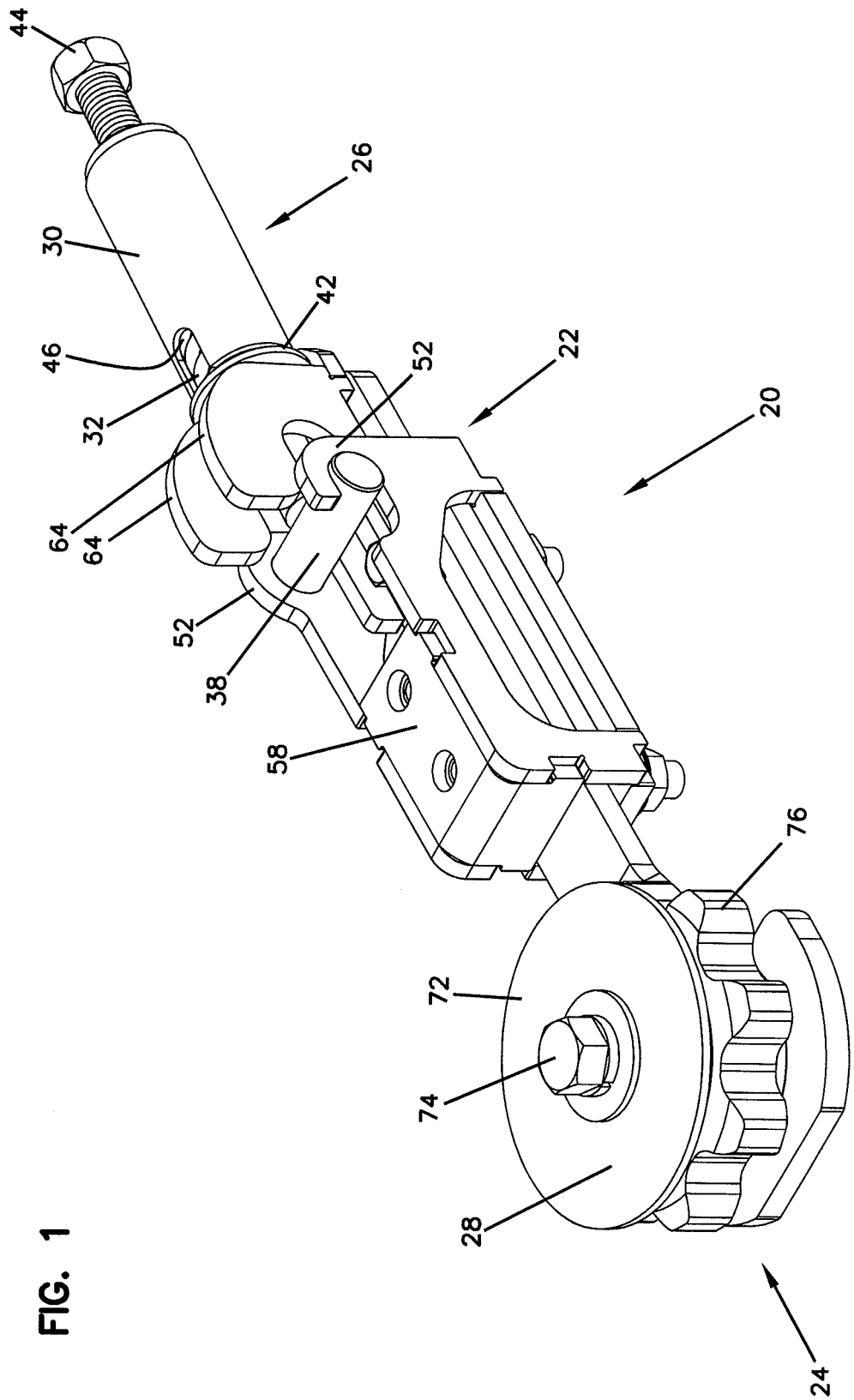
FIG. 1 is a perspective view of a tensioning apparatus according to the principles of the present invention.
Figure 2:
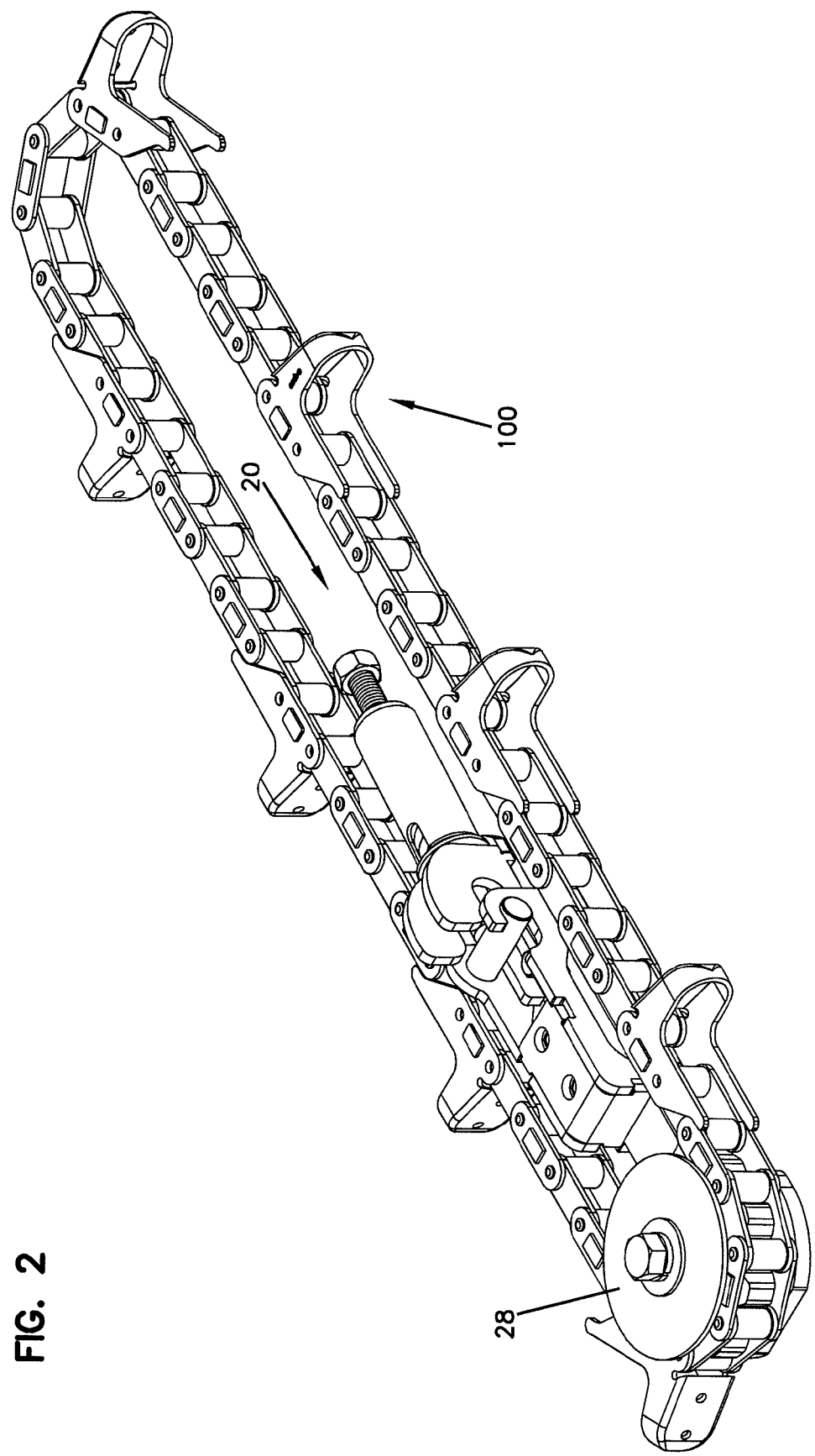
FIG. 2 is a perspective view of the tensioning apparatus shown in FIG. 1 with a chain mounted on the idler.
Figure 13:
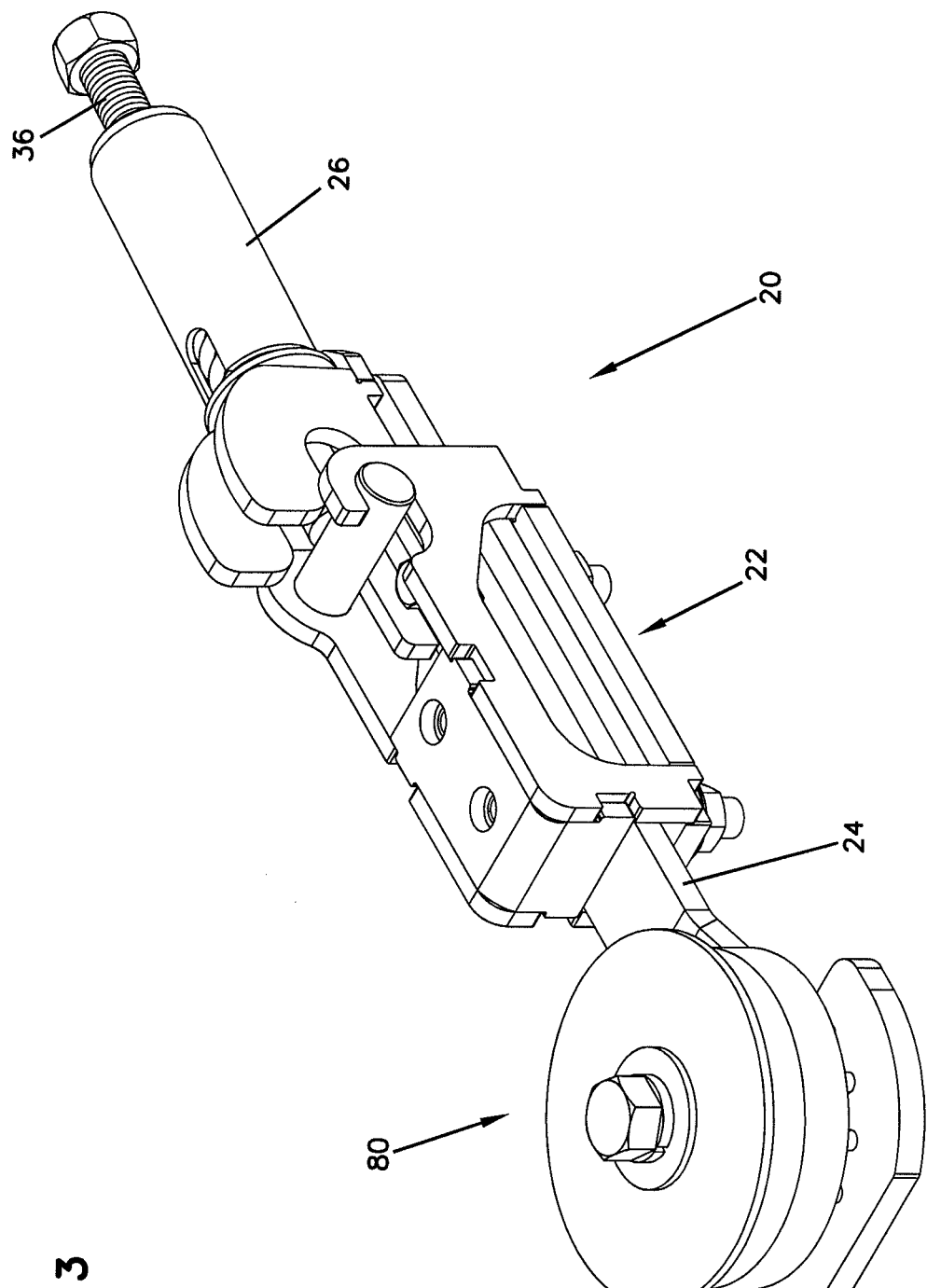
FIG. 13 is a perspective view of the tensioning apparatus shown in FIG. 1 with a second embodiment of an idler.

Referring now to the drawings, and in particular FIG. 1, there is shown a quick release tensioning system (20) according to the principles of the present invention. The tensioning system (20) is configured for providing tension to a loop element, such as a chain (100), as shown in FIG. 2. Moreover, the tensioning system may be configured for placing tension on a belt, as shown in the embodiment of FIG. 13. The tensioning system (20) includes a base (22), an idler support assembly (24), a spring handle assembly (26) and an idler (28). The idler support assembly (24) is slidably retained in the base (22). The spring handle assembly (26) rotatably mounts to the base (22) and also engages the idler support assembly for tensioning, as explained hereinafter. Belts or chains extend around the idler (28) and engage other idlers, sprocket, or gears (not shown).

Figure 3:
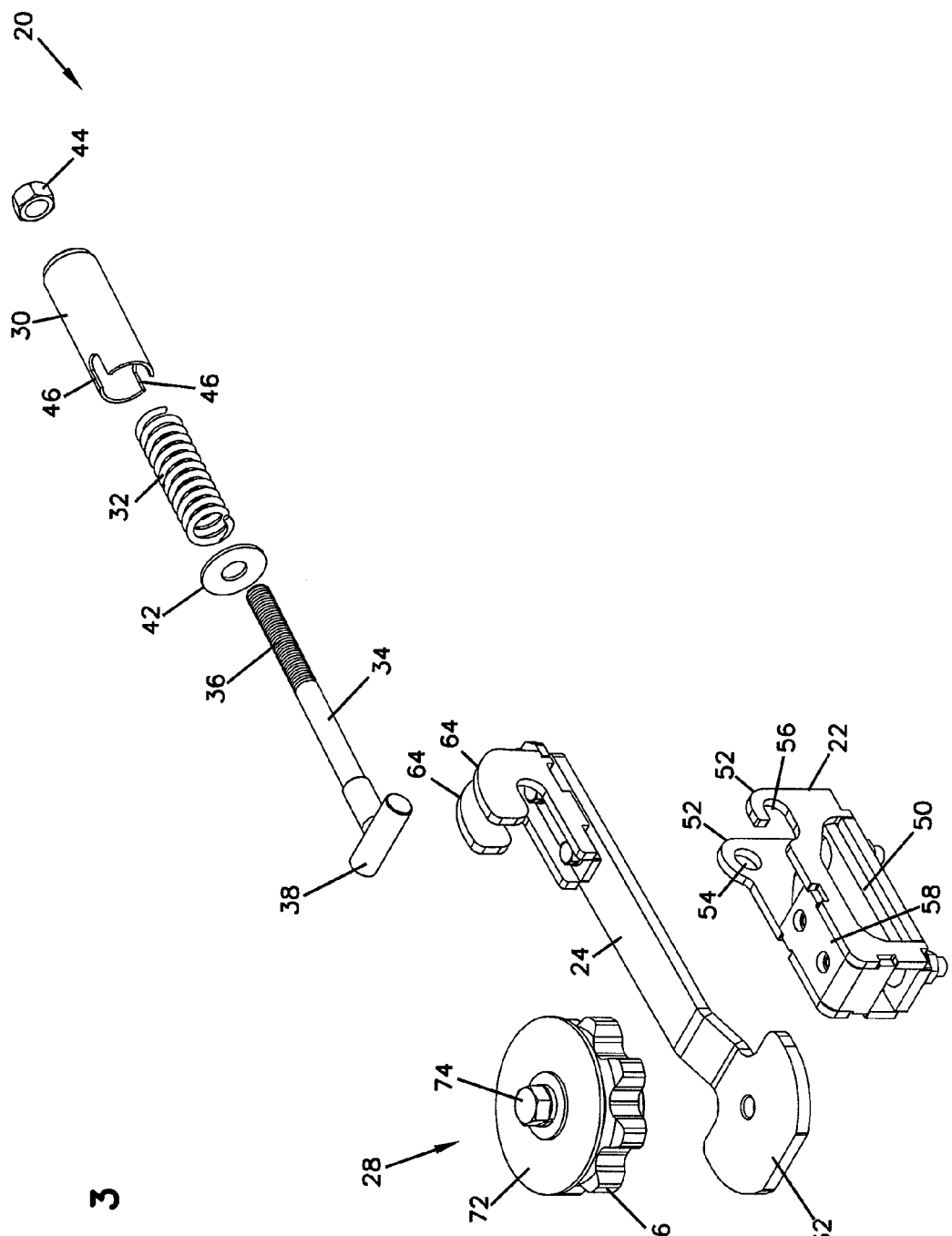
FIG. 3 is an exploded perspective view of the tensioning apparatus shown in FIG. 1.
Figure 14:
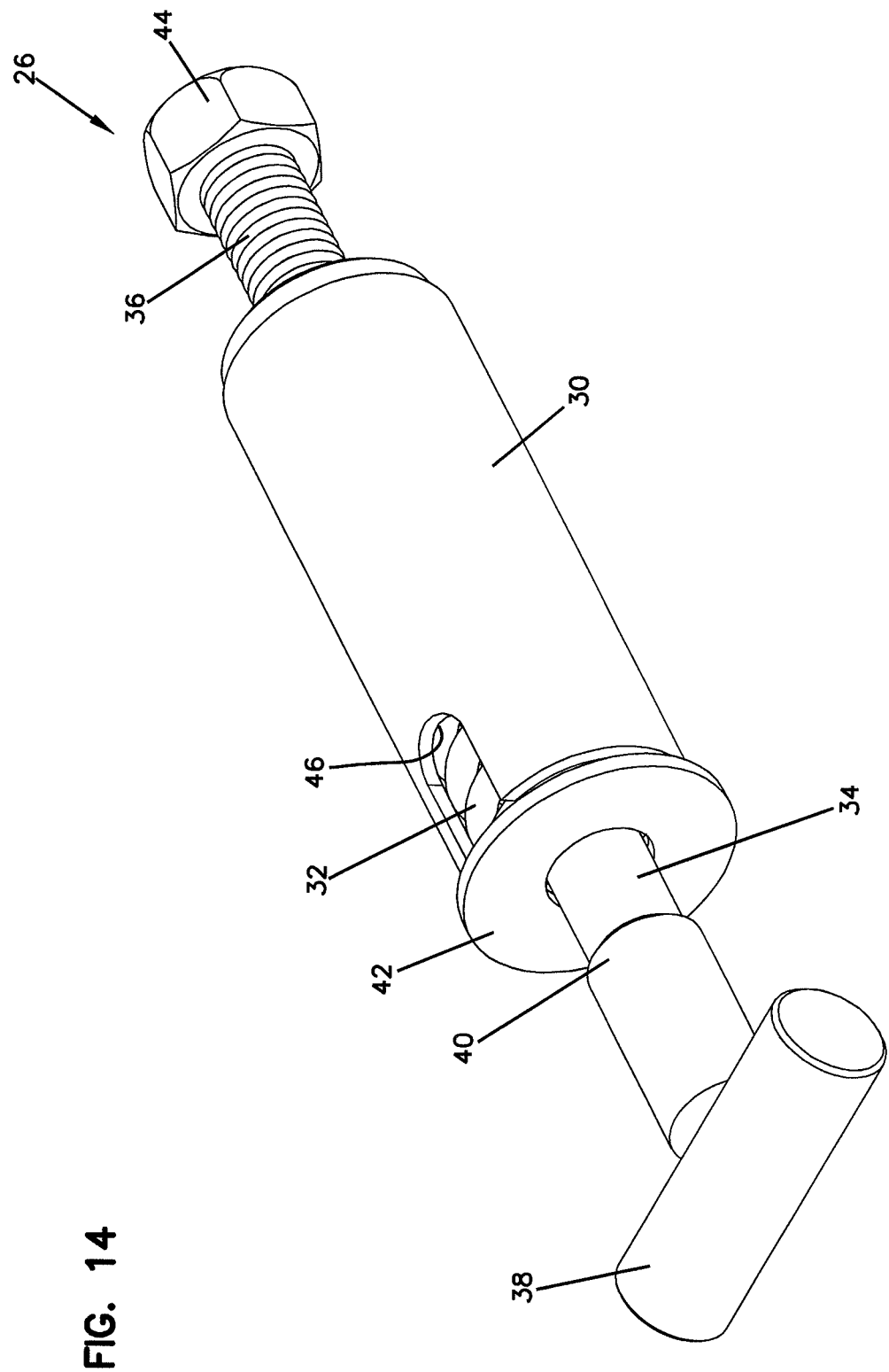
FIG. 14 is a perspective view of a spring handle assembly for the tensioning apparatus shown in FIG. 1.

As shown most clearly in FIGS. 3 and 14, the spring handle assembly (26) includes a rotatable handle (30) defining an interior space extending around and housing a helical spring (32) that is placed over the shaft of a tension bar (34). The tension bar (34) includes a threaded portion (36) engaging complimentary threads on the handle (30). The tension bar (34) has a hinge pin (38) extending transversely to the longitudinal axis of the shaft of the tension bar (34). The hinge pin (38) acts as a pivot point and creates a rotational axis for the spring handle assembly (26). When assembled, the spring (32) engages a washer (42) movable axially along the tension bar (34). The washer (42) engages a widened step (40) that prevents further movement of the washer (42) downward along the tension bar (34), as explained hereinafter. An internally threaded hex head or adjustment knob (44) extends beyond the handle (30) and can be utilized to increase leverage to rotate the handle assembly (26) between the locked and unlocked positions. The handle (30) includes notches (46) configured for engaging a complementary tab on the base (22), as explained hereinafter.

The base (22) includes a slide bearing (50) which provides a surface for slideable engagement with the idler support assembly (24), as explained hereinafter. A hinge barrel (52) includes two spaced apart vertical planar elements configured for extending around the pin (38) to create a rotational axis for the handle assembly (26). The hinge barrel (52) includes a hole (54) in the first vertical planar element and a hook (56) formed in the second vertical planar element receiving the pivot pin (38). The hole (54) and hook (56) allow for easily sliding the pivot pin into or out of the hole (54) and into or away from the hook (56) for quick and easy assembly and disassembly. A retainer (58) extends over the idler support assembly (24) when assembled to retain the idler support assembly positioned on the base (22). Mounting hardware (60) provide for attaching the spring tensioning system (20) to an implement, such as to a corn head of a combine, or other equipment so that the tensioning system (20) is positioned to engage a belt or chain (100) and provide the required path and tension.

The idler support assembly (24) includes an idler support (62) and a release cam (64) at one end of the idler support assembly (24). A tab (66) extends outward beyond the surface of the release cam (64) to engage the complementary notches (46) of the handle (30). A receiving channel (68) is configured for receiving the tension bar hinge pin (38) when assembled. A rotating idler element (70) mounts at an opposite end of the idler support (62). The idler includes an idler housing (72), a mounting pin or bolt (74) acting as a pin defining a rotational axis for the idler (28). In the embodiment shown in FIG. 1, the idler (28) includes a toothed sprocket (76) configured for engaging a chain (100). As shown in FIG. 13, the idler can be configured as a pulley (80) to engage a belt. Other types of idlers can also be interchanged to engage other types of belts or chains.

When assembled, the idler support assembly (24) is held in the base (22) by the retainer (58) and slides longitudinally on the slide bearing (50). A first end extends beyond a first end of the base (22) and supports the idler (28) while a second end extends from a second end of the base (22) and includes the release cam (64). The release cam is formed of two parallel vertical planar elements on either side of the handle assembly (26). The outer edges of the planar elements form a cam surface. The distance from the rotational axis of the handle assembly (26) to the edge of the cam increases from a top edge to a lower edge. With the handle assembly (26) between the planar elements, the washer (42) engages the cam surface when engaged, as explained hereinafter.

Figure 4:
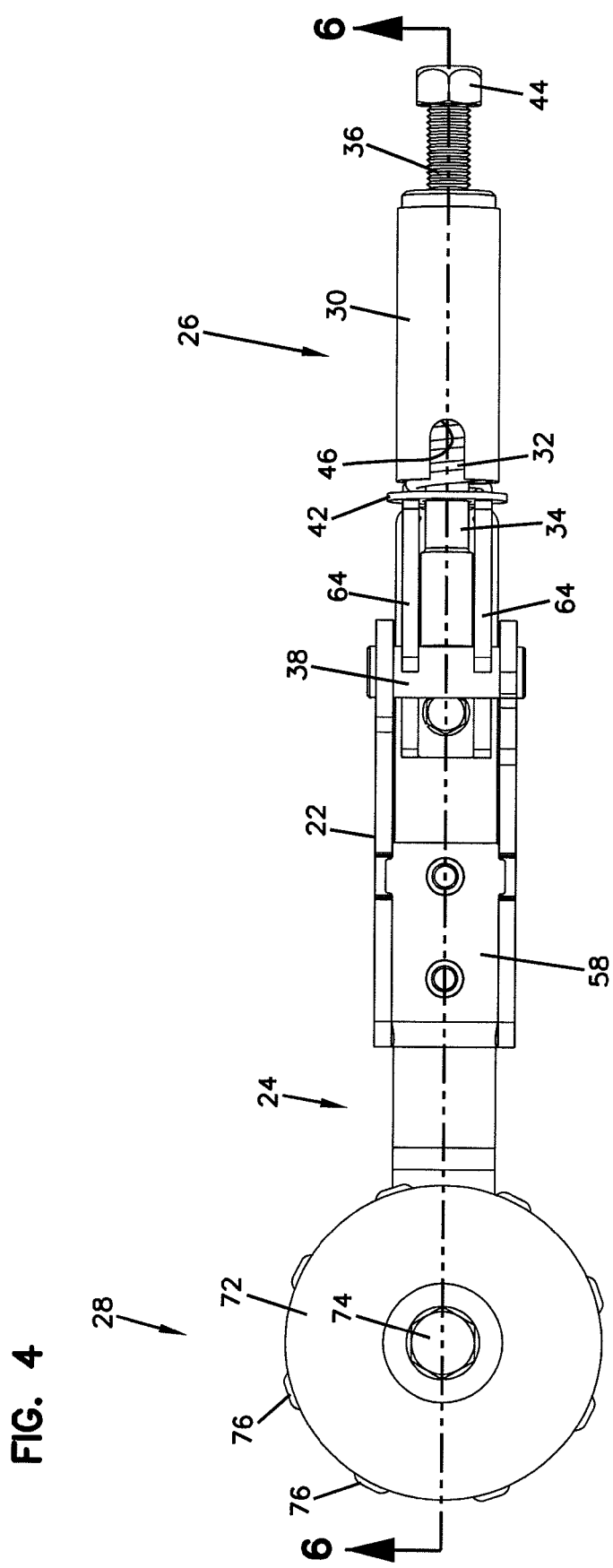
FIG. 4 is a top plan view of the tensioning apparatus shown in FIG. 1 in a first tensioning position.
Figure 5:
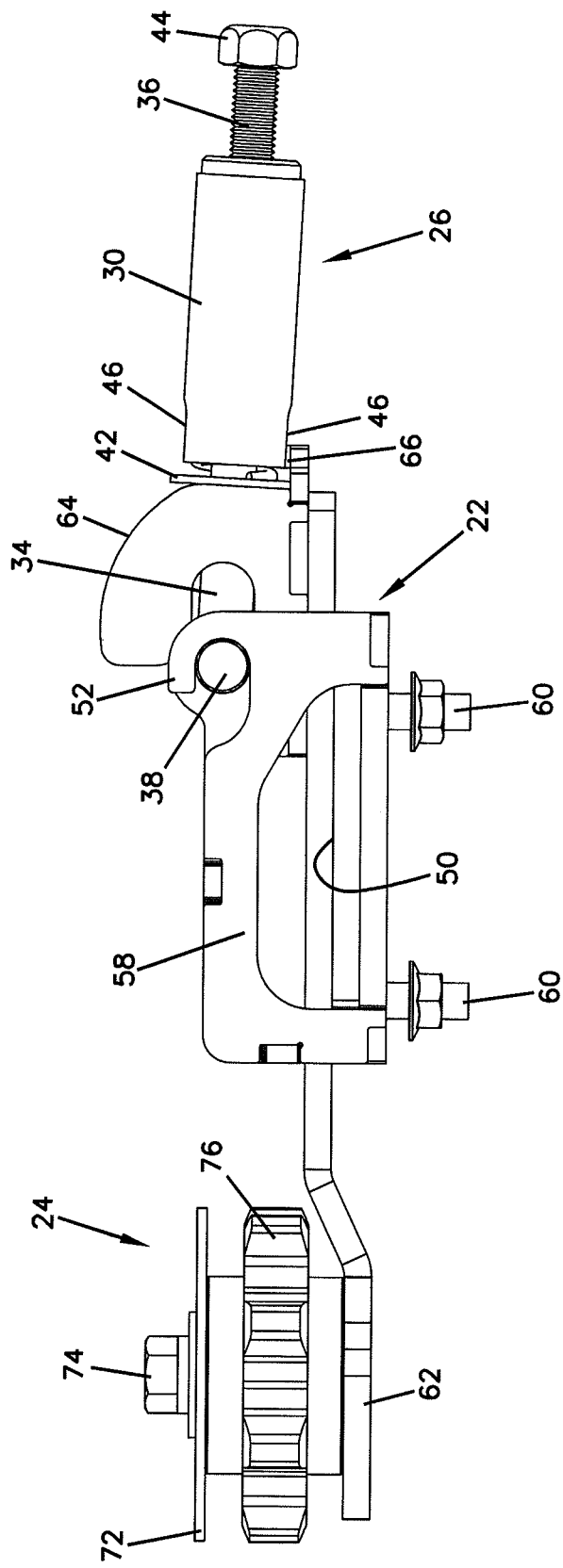
FIG. 5 is a side elevational view of the tensioning apparatus shown in FIG. 4.
Figure 6:
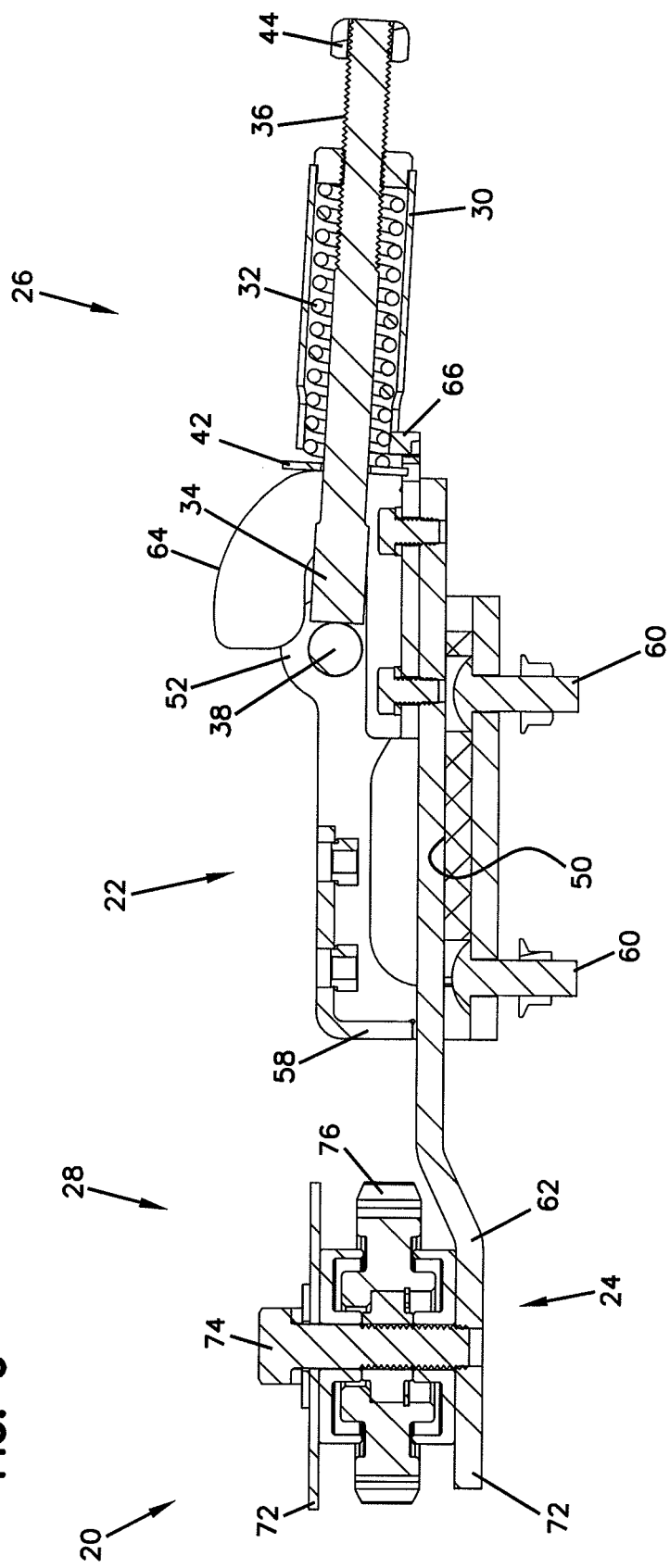
FIG. 6 is a sectional view taken along line 6-6 of FIG. 4.

The spring handle assembly (26) pivotally mounts to the base (22) with the hinge pin (38) extending through the hole (54) and retained in the hook (56). The spring handle assembly (26) generally rotates from a position slightly below the plane of the bearing surface of the base (22) as shown in FIGS. 4-6, through an intermediate position shown in FIGS. 7-9 to a position generally transverse to the plane of the bearing (50) shown in FIGS. 10-12.

Figure 10:
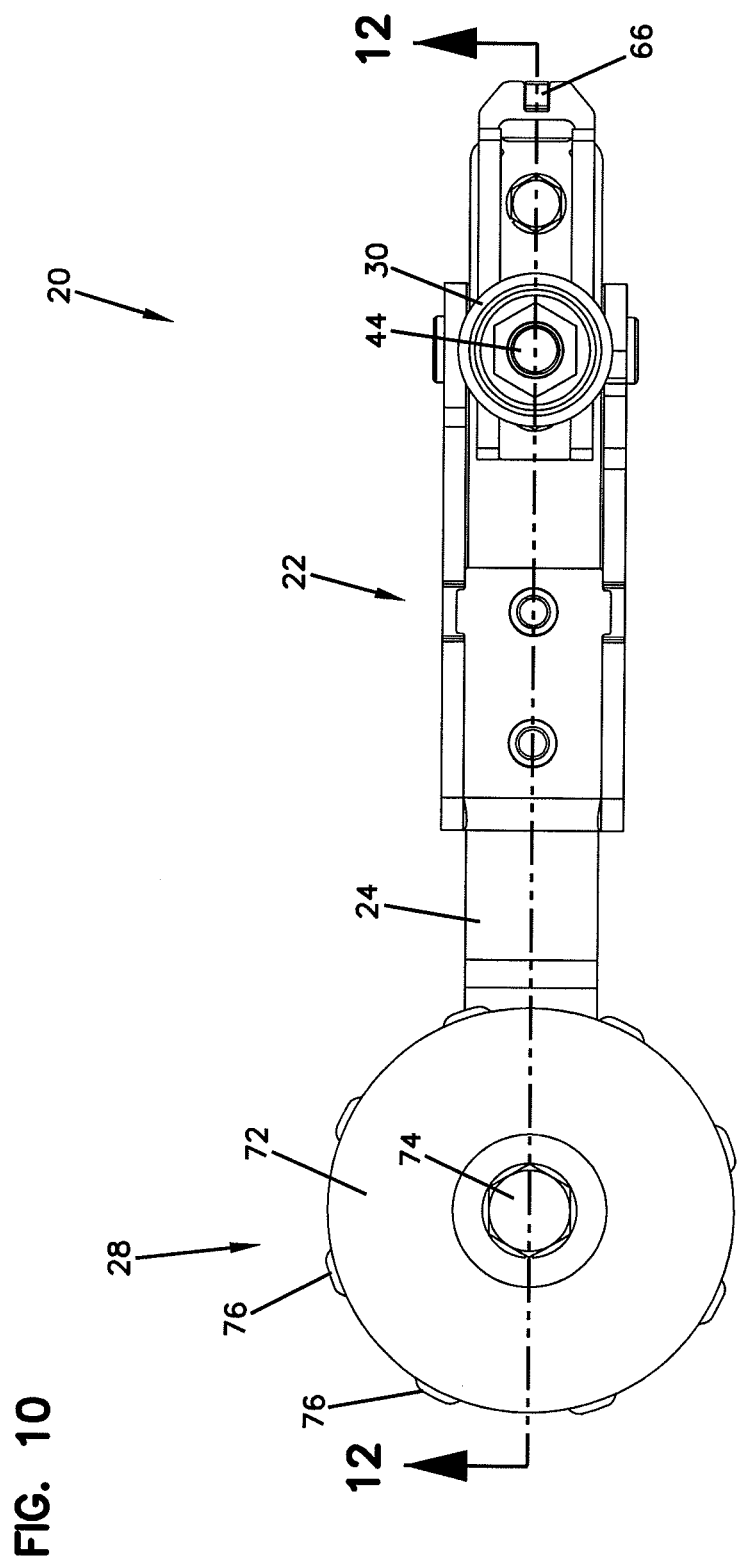
FIG. 10 is a top plan view of the tensioning apparatus shown in FIG. 1 in a third released position.
Figure 11:
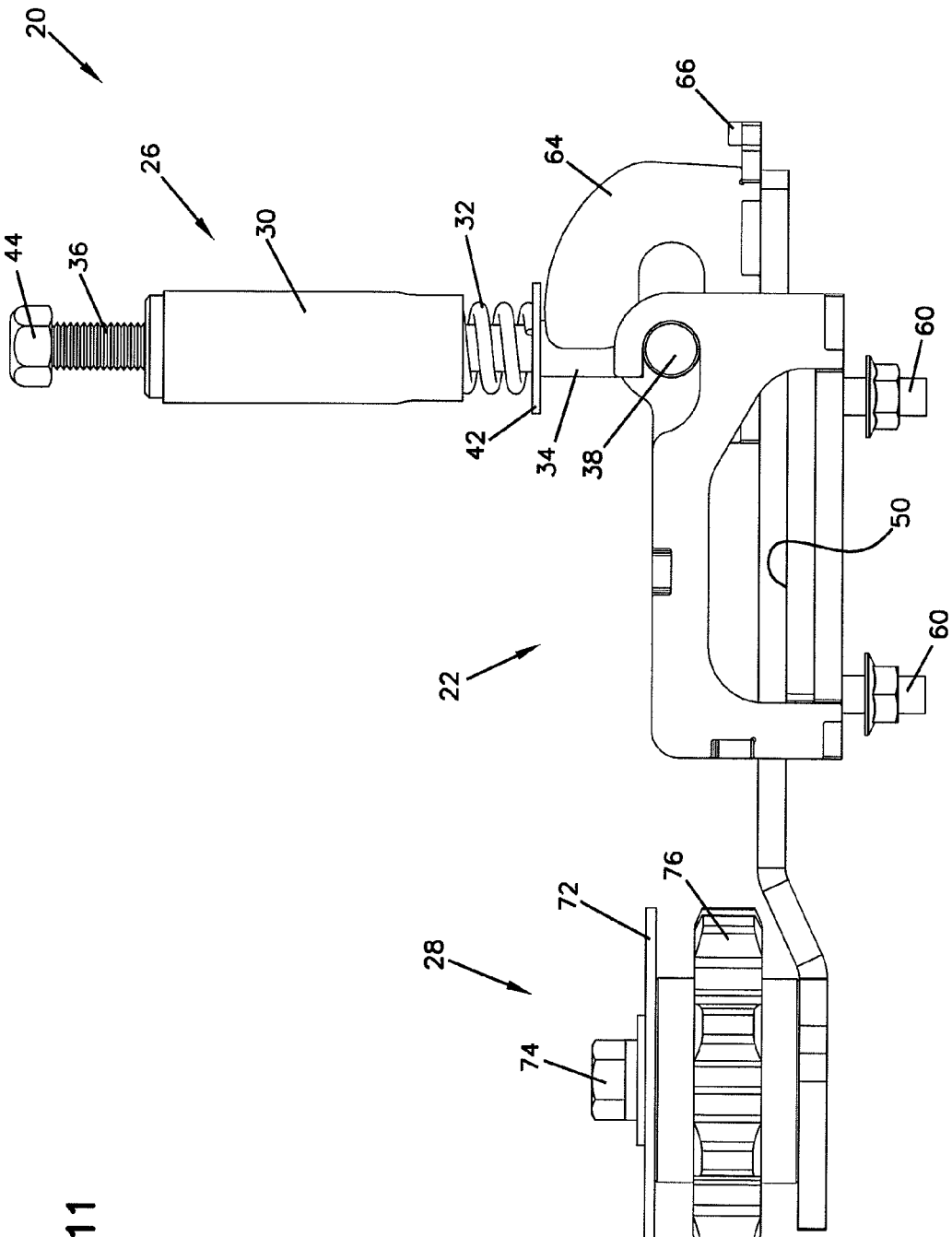
FIG. 11 is a side elevational view of the tensioning apparatus shown in FIG. 10.
Figure 12:
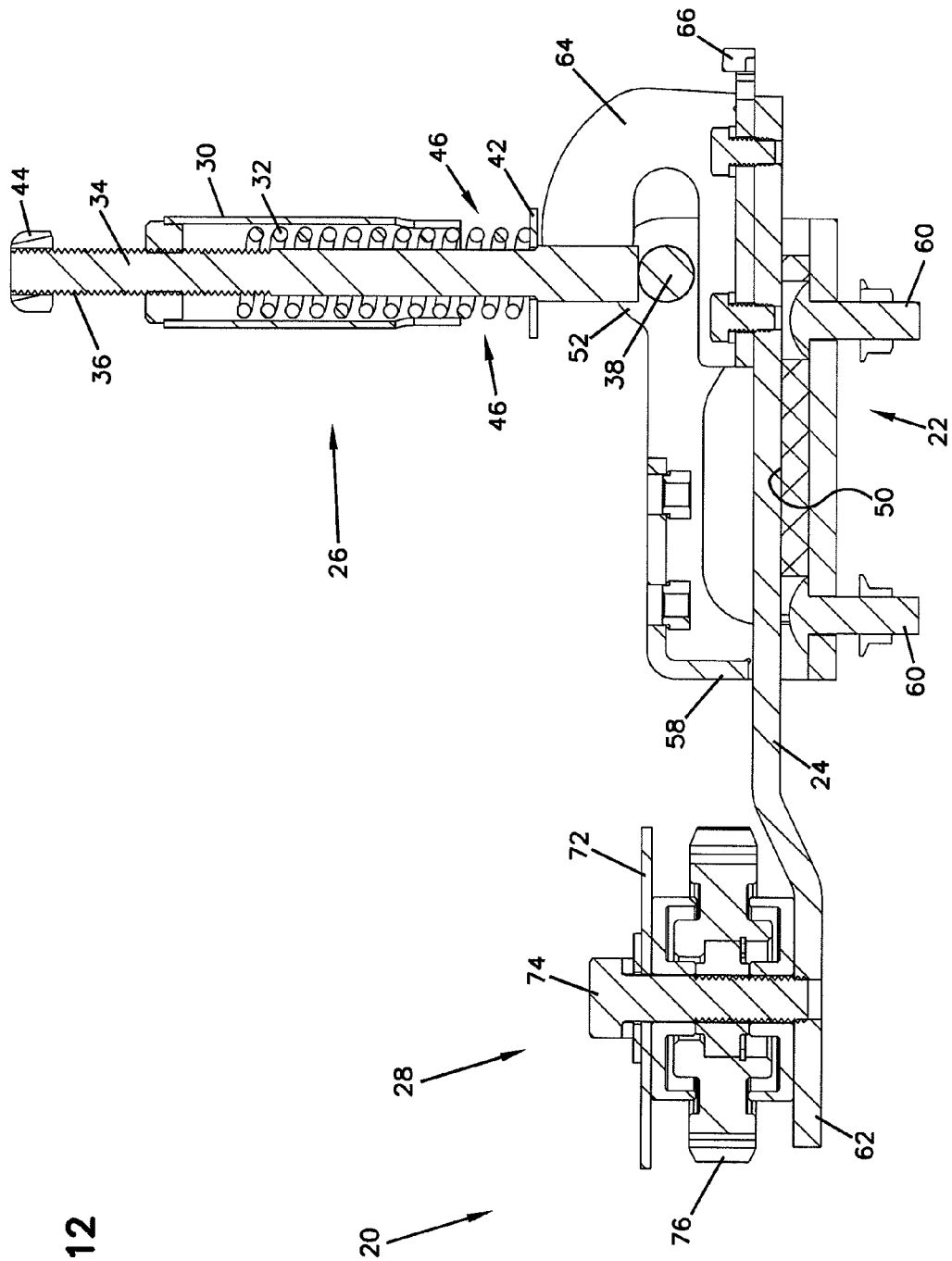
FIG. 12 is a sectional view taken along line 12-12 of FIG. 10.

In the release position shown in FIGS. 10-12, the belt or chain (100) is loose with no tension and may be removed if needed. The idler support assembly (24) is free to slide within the base (22). The washer (42) is not engaged and falls on the tension bar (34) to the step (40), which is wider than the opening of the washer (42) and prevents the washer (42) from falling further.

In the engaged position shown in FIGS. 1-6, the washer (42) is biased by the spring (32) against the surface of the cam (64). The washer (42) biases the idler support assembly (24) towards the idler (28). Travel of the idler support assembly (24) is limited in this position by the idler (28) engaging the chain (100), which is also wrapped around at least one other sprocket or idler. In the position shown in FIGS. 1, 2 and 4-6, one of the notches (46) in the handle (30) engages the tab (66) of the idler support assembly (24). This engagement prevents the handle (30) from rotating about the tension bar (34). This engagement locks the handle (30) in a position when adjusted and locked. It can be appreciated that with the washer (42) pressing against the surface of the cam (64), tension may be applied as the idler support assembly (24), and therefore the idler (28) is moved outward from the base (22) and therefore increases the path around which the belt or chain (100) must follow. As viewed in FIGS. 4-6, the washer (42) presses on the cam (64) to move the idler support assembly and therefore the idler (24) to the left.

Rotation of the handle (30) decreases the distance between the handle pivot (38) and the washer (42) with the handle (30) pushing against the compressed spring (32) that engages the washer. This action may compress the spring (32) further and increases tension. However, rotation in an opposite direction moves the handle (30) away from the pivot (38), which moves the upper end of the interior of the handle (30) and allows the spring to move up the tension bar (34) so that it may extend. This decreases the tension upon the belt or chain (100) as the idler (28) is moved to a position toward the base (22) creating a smaller path of travel. The force of the spring (32) is maintained as it is compressed between the internal upper end of the handle (30) and the washer (42) As the washer (42) engages the lower end of the handle (30), the handle (30) acts as a travel limit for the washer (42) and the compressed length of the spring (32) is maintained to apply a constant compressive force. The position of the washer (42) relative to the tension bar (34) is adjusted by rotating the handle (30) to move the handle upward or downward along the length of the threaded portion (36) of the tension bar (34). The lower end of the handle (30) also acts as a travel limiter for the washer (42) and therefore a compression limit for the spring (32). As the washer (42) cannot move past the lower end of the handle (30), the spring (32) cannot be compressed to a length less than the distance between the upper end of the interior of the handle (30) and the lower end of the handle (30). This space maintains a minimum length for the spring (32) when compressed.

To place tension upon a chain or belt, the belt or chain (100) is first loosely positioned around the idler (28) with the spring tensioning system (20) in the position shown in FIGS. 10-12. At this position, the idler support assembly (24) slides freely relative to the base (22). The spring handle assembly (26) extends substantially upward and the washer (42) rests on the step (40) and is not engaging the cam (64). A desired final position is roughly estimated and the adjustment knob (44) and handle (30) are rotated to a position for engaging the washer when moved to a location for engaging the washer (42) with the desired tension when the handle assembly (26) is in the position shown in FIGS. 4-6. After proper adjustment is made, the spring handle assembly (26) is rotated downward reaching the position shown in FIGS. 7-9. At this position, the washer (42) begins to engage the surface of the cam (64) and is lifted from the step (40). The engagement of the washer (42) against the cam (64) pushes the idler support assembly (24) further along the bearing surface (50) of the base (20) with the idler (28) extending further from the base (22). The spring (32) begins to compress at this position.

As the spring handle assembly (26) is rotated further downward to the position shown in FIGS. 1, 2 and 4-6, the shape of the surface of the cam (64) pushes the idler support assembly (24) further with the cam (64) sliding inward toward the base (22) and the opposite end with the idler support (28) moving further outward. This places additional tension on the chain (100). The spring (32) provides pressure against the washer (42). The handle (30) is positioned so that one of the notches (46) engages the tab (66) on the base (22). The engagement of the tab (66) with one of the notches (46) prevents the handle (30) from rotating and maintains the handle (30) in a locked position so that it cannot not inadvertently rotate and lose tension. The handle assembly (26) is rotated past a toggle position slightly over center. In the position shown, the spring handle assembly (26) is moved approximately three degrees below the plane of the surface of the bearing (50). With the over center lock past the toggle point and engagement between the tab (66) and one of the notches (46), the tensioning assembly (20) is securely held at a locked position.

The assembly (20) is easily disengaged by lifting the spring handle assembly (26) upward so that the washer (42) disengages the surface of the cam members (64). This allows for easy adjustment should the tension be too great or too strong. If the tension is too great, it can be appreciated that the washer (42) may not slide sufficiently down the ever widening radius of the surface of the cam (64). Therefore, the spring handle assembly (26) may not lock into position as the notches (46) cannot engage the tab (66) and the handle assembly (26) cannot pass through the toggle point and reach a position past center. The handle (30) may be rotated to move the handle (30) further up the shaft of the pivot bar (34) to loosen tension. The spring handle assembly (26) is pivoted downward to the tensioned position shown in FIGS. 1, 2 and 4-6.

If the tension is not sufficient, the spring handle assembly (26) may be rotated so that the handle (30) pushes the washer (42) further down the tension bar (34). Therefore, when moved into the engaged position, the washer (42) pushes the cam (64) and therefore the idler support (24) further along the bearing surface (50) to extend the idler (28) further from the base (22) to provide greater tension on the belt or chain (100).

It can be appreciated that the spring tensioning system (20) is a quick release system that is simply engaged and disengaged by moving the spring handle assembly (26) upward and downward between an engaged position and a disengaged position utilizing a camming action that locks the spring handle assembly (26) in a tensioned position. Moreover, adjustment may be made by hand with a simple rotation of elements to decrease or increase the tension. It can also be appreciated that no tools are required for either decreasing or increasing tension on the belt or chain (100).

Figure 15:
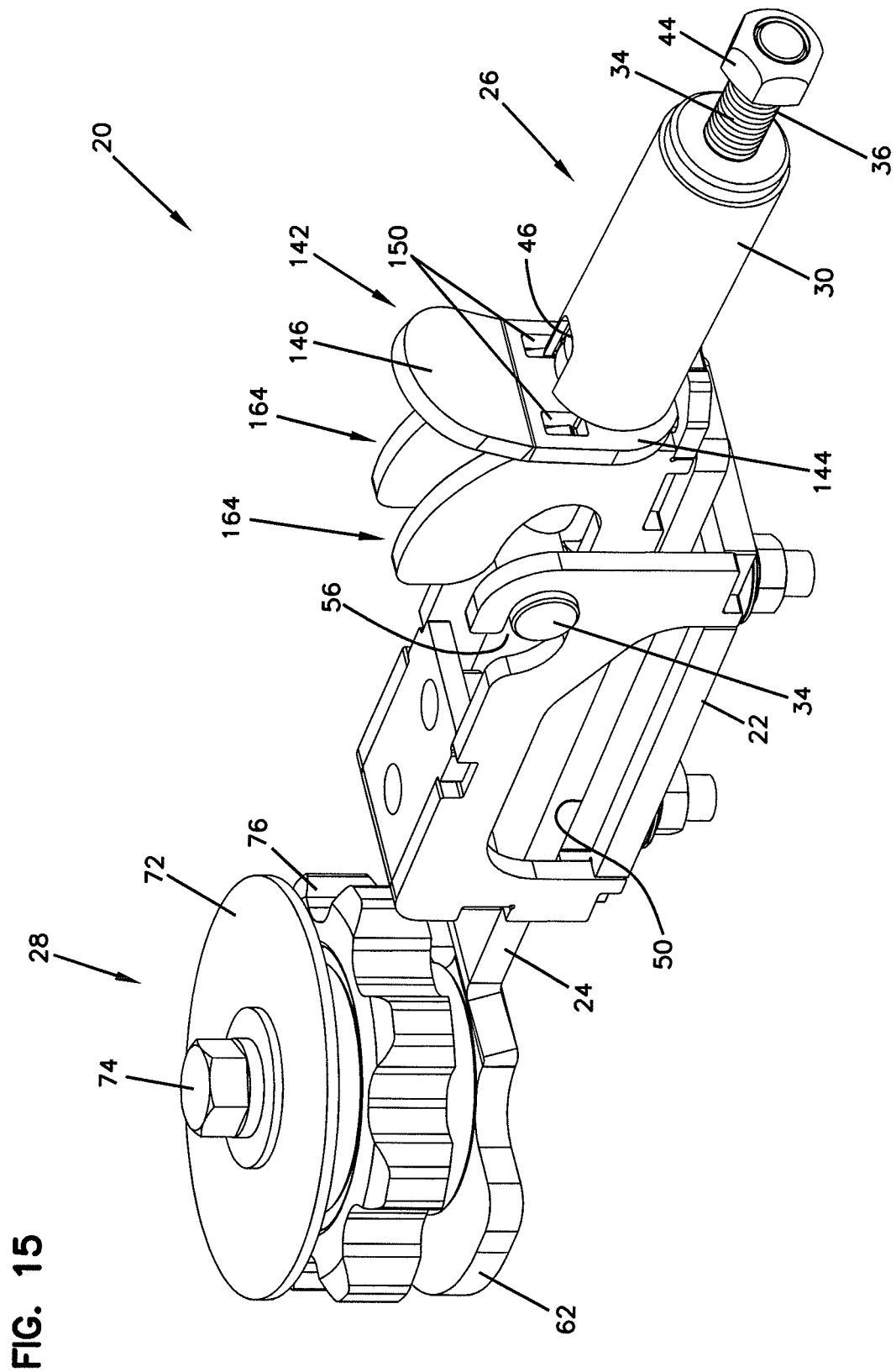
FIG. 15 is a perspective view of a tensioning apparatus according to the present invention with an alternate embodiment of the cam and a cam locking member.
Figure 16:
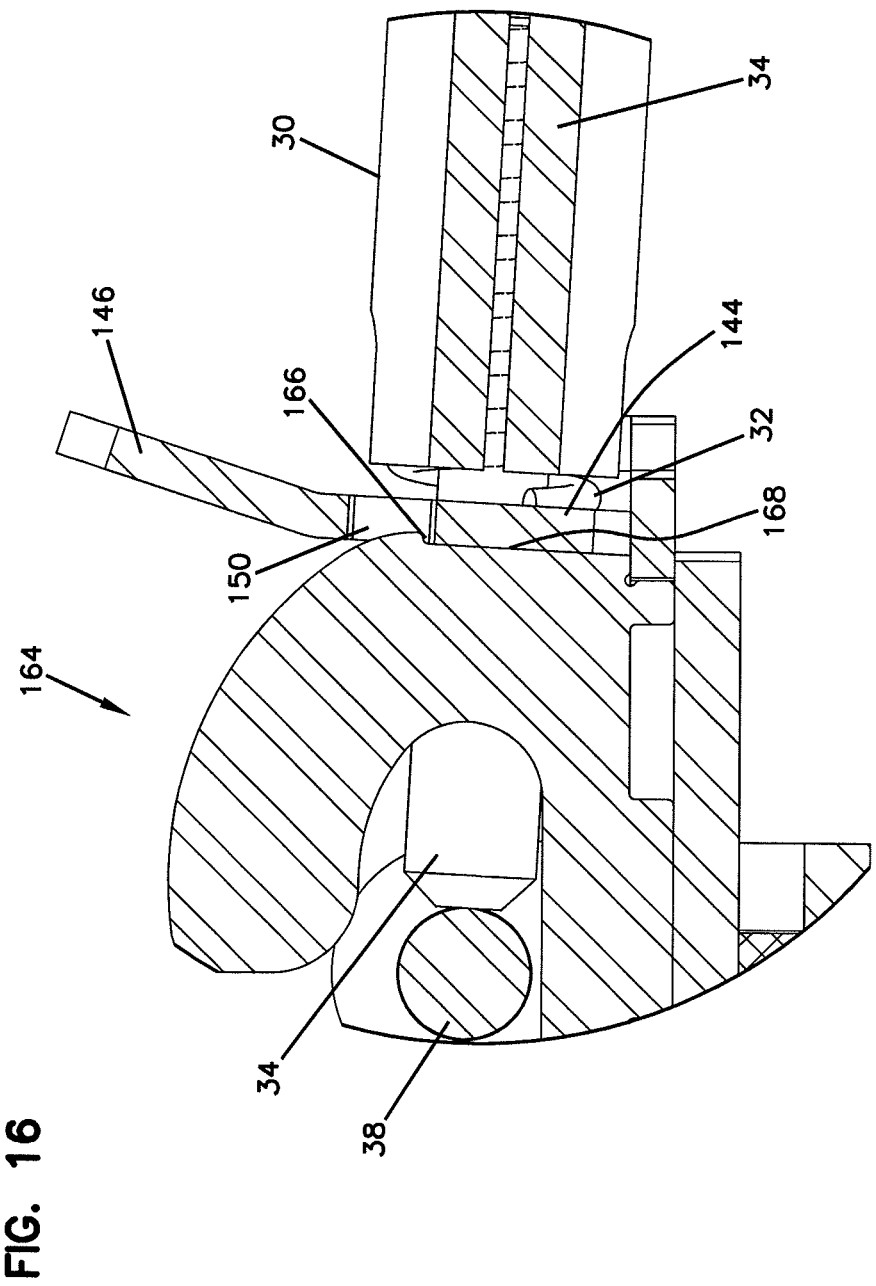
FIG. 16 is a side sectional detail view of the cam and cam locking member shown in FIG. 15
Figure 17:
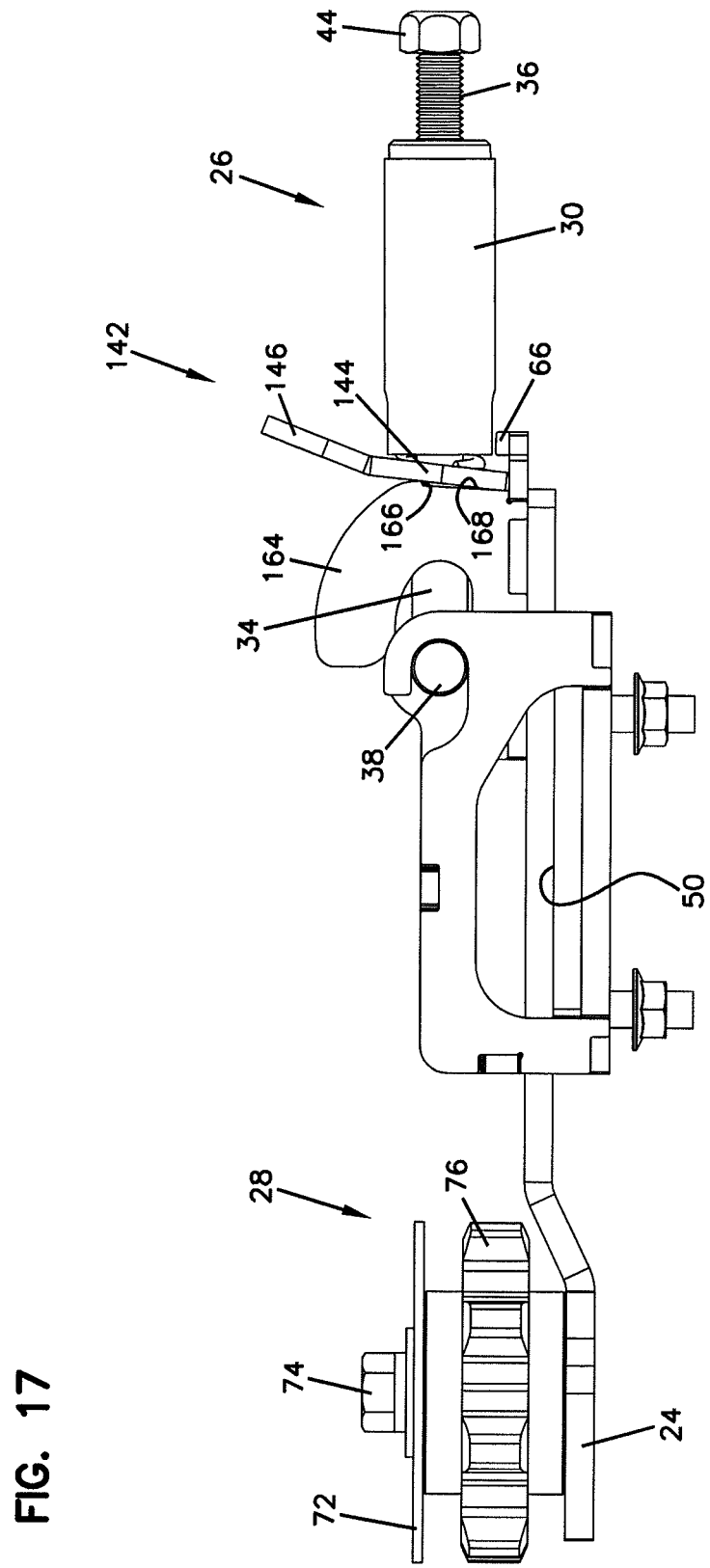
FIG. 17 is a side elevational view of the tension apparatus shown in FIG. 15 with the cam locking member released.
Figure 18:
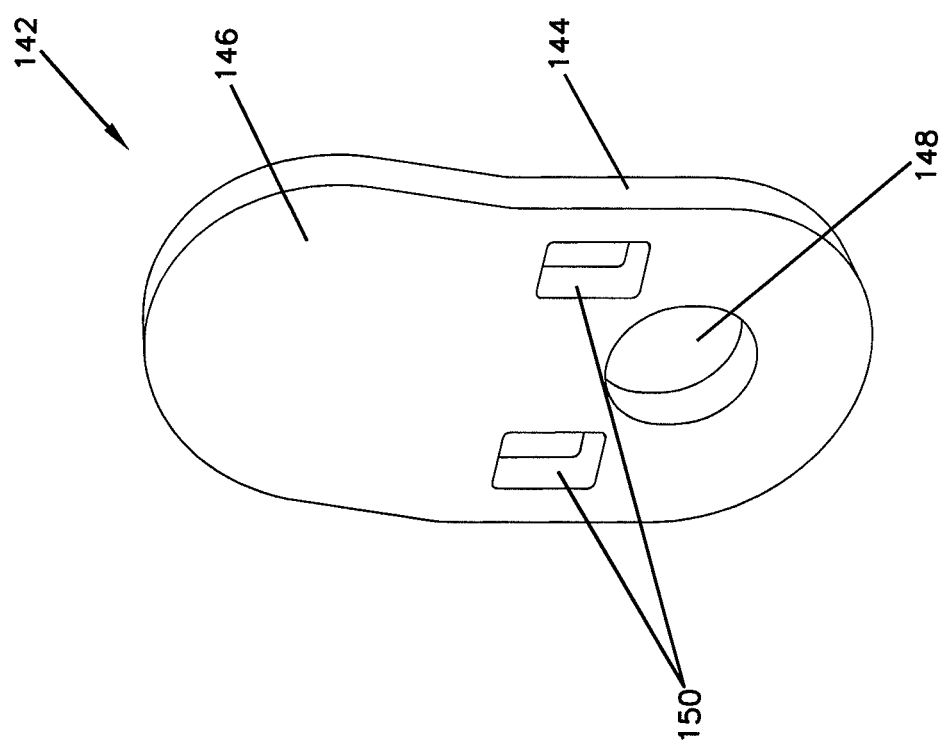
FIG. 18 is a perspective view of the cam locking member for the tensioning apparatus shown in FIG. 15.

Referring now to FIGS. 15-17, there is shown an alternate embodiment for the cam and locking system for the tensioning apparatus (20). A cam includes two planar vertical elements (164) similar to the cam (64). However, the cam surface (164) includes a shoulder (166) forming a recess (168). The recess (168) is formed to extend approximately 3 degrees beyond a direction perpendicular to the bearing surface (50) of the base (22). As shown in FIG. 18, a complementary locking member (142) replaces washer (42). The locking member (142) includes a washer body (144) having an orifice (148) through which the tension bar (34) extends similarly to washer (42). The locking member (142) also includes a push tab portion (146) extending from the washer body (144) and at a slight angle to the washer body (144). The washer body also includes side by side slots (150) configured for engaging the shoulder (166) in a locked position.

Figure 7:
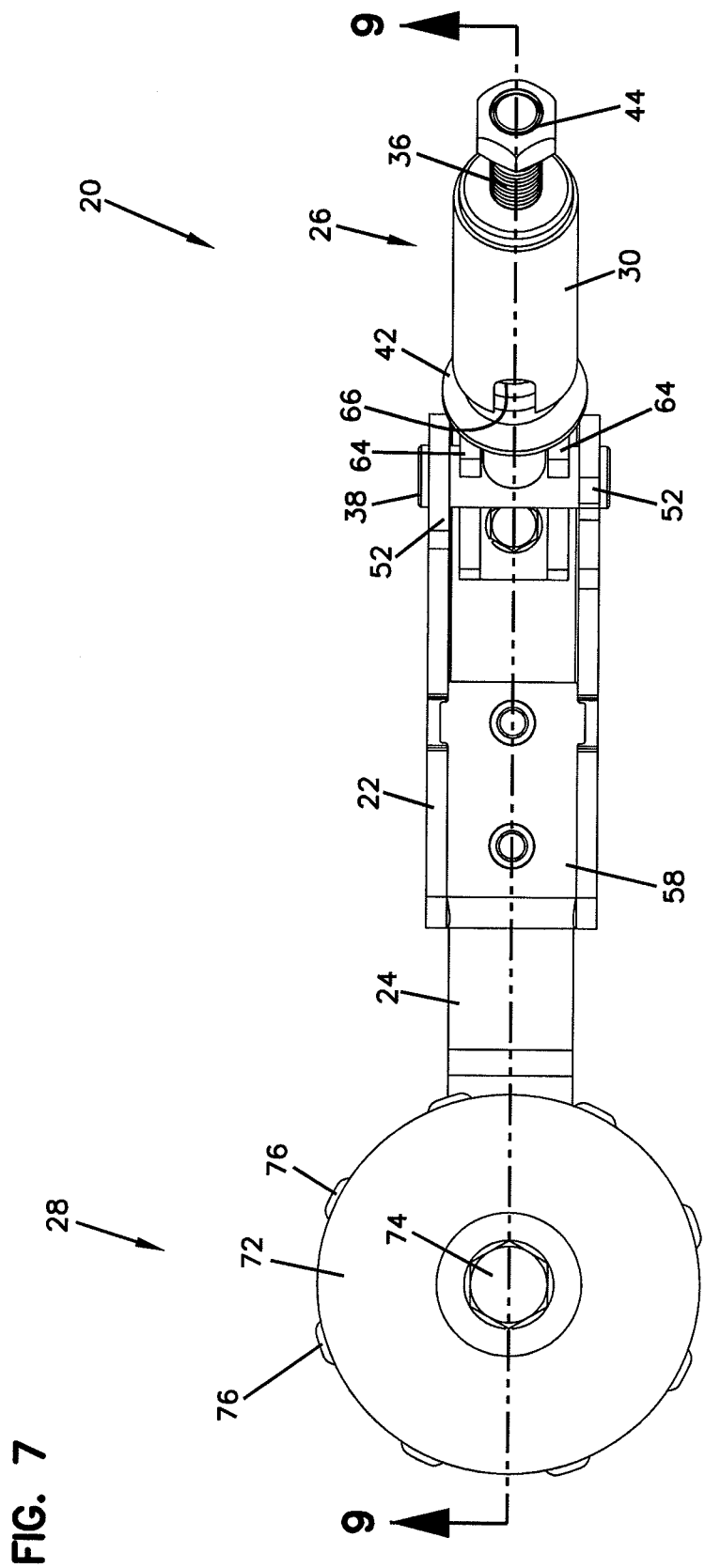
FIG. 7 is a top plan view of the tensioning apparatus shown in FIG. 1 in a second intermediate position.
Figure 8:
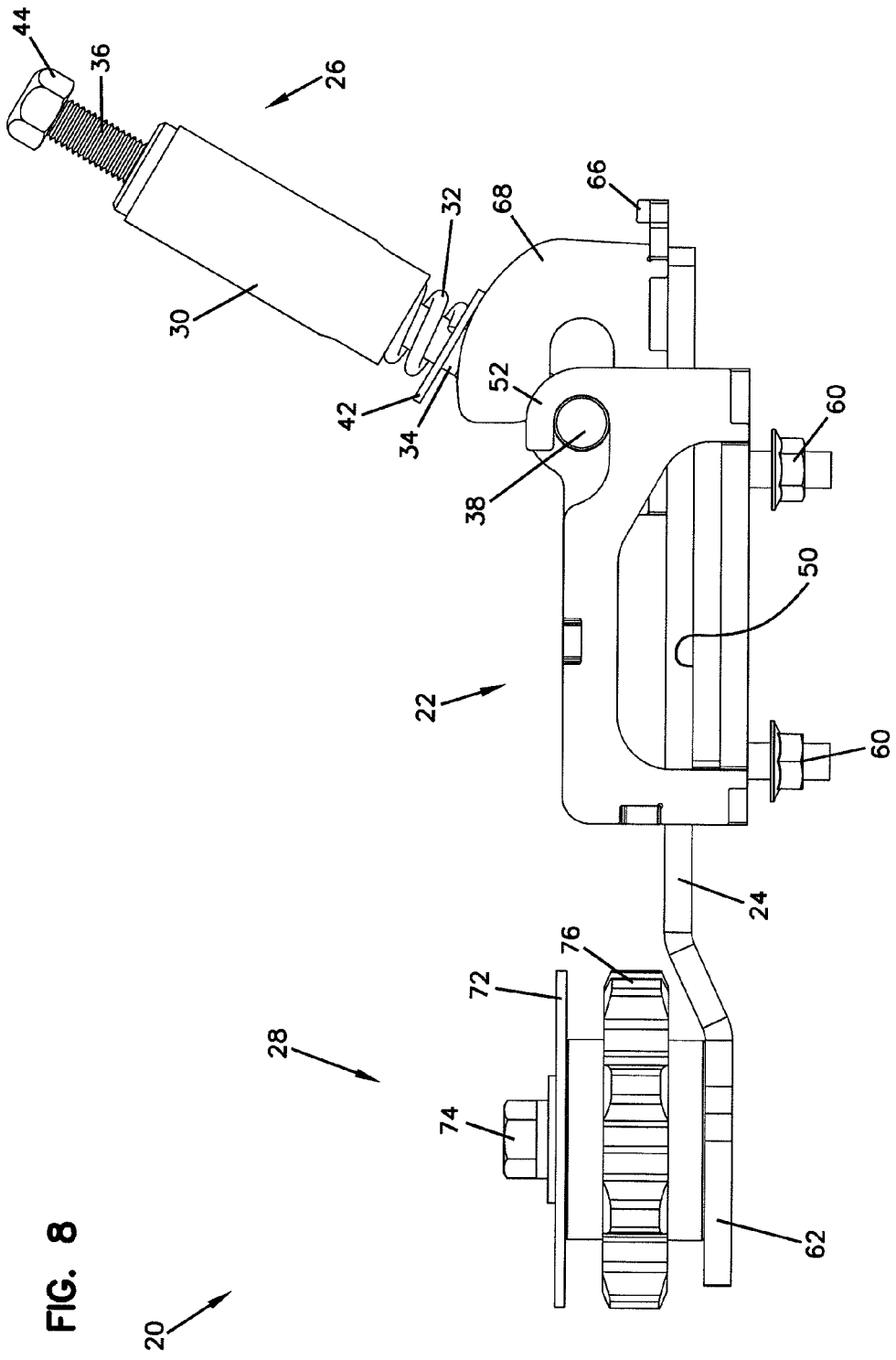
FIG. 8 is a side elevational view of the tensioning apparatus shown in FIG. 7.
Figure 9:
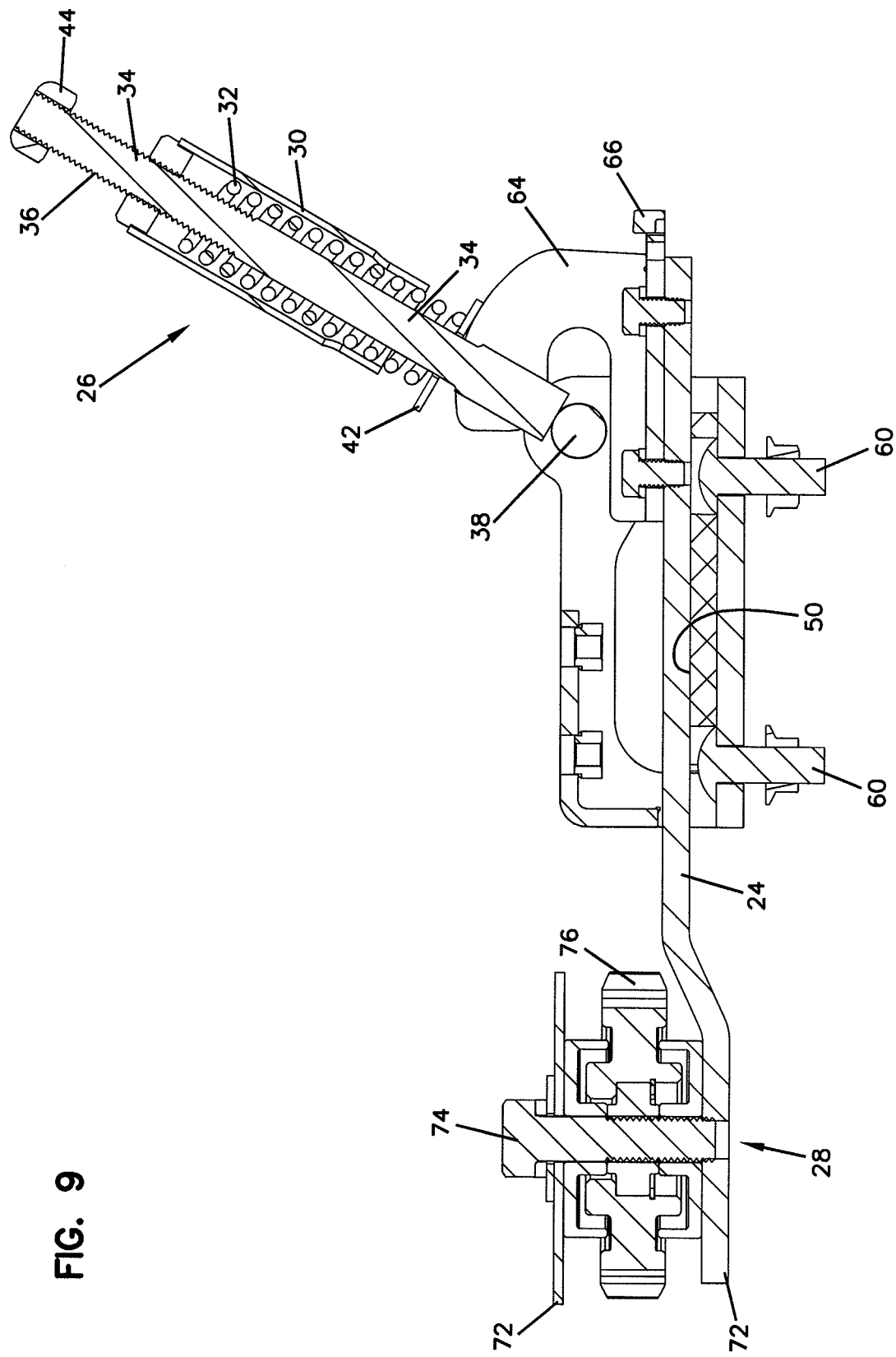
FIG. 9 is a sectional view taken along line 9-9 of FIG. 7.

The cam (164) and locking member (142) operate as cam (64) and washer (42) at the release position shown in FIGS. 10-12 and the intermediate position shown in FIGS. 7-9. However, when the handle assembly (26) is moved to the locked position shown in FIGS. 15 and 16, the washer body (144) slides over the shoulder (166) and into the recess (168). The shoulder (166) of each cam member (164) protrudes into a corresponding slot (150) in the washer body (144). At this position, the locking member (142) cannot move as the washer body (144) is biased against the surface of the recess (168) and the shoulder (166) engages the slot (150). The recess (168) extends slightly beyond the direction perpendicular to the slide bearing (50) forming a toggle in addition to the positive lock from each shoulder (166) engaging the complementary slot (150).

To release the locking member (142), the angled push tab portion (146) is pushed away from the cam (164), as shown in FIG. 17. This action raises the washer body (144) away from the recess (168) so that the slots (150) disengage from the associated shoulders (166). With the push tab portion (146) held at this position, the handle assembly (26) may be rotated upward from the position shown in FIGS. 15-17 and the washer body (144) slides over the shoulders (166). As with washer (42) and cam (64), the cam (164) and locking member (142) provide a secure system to prevent accidentally loosening of the tensioning system (20) and with the notches (46) and tab (66) providing a second safeguard to prevent movement from the locked position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tensioner comprising:
    a base;
    an idler support assembly linearly slidably retained on the base, the idler support assembly including a support element having a cam surface at a first end;
    an idler mounted at a second end of the idler support assembly support element, the idler rotating about a first axis of rotation;
    a spring loaded handle assembly rotatably mounted to the base, the handle assembly including a tension bar, a handle longitudinally adjustably mounted to the tension bar, an engagement element, and a biasing element intermediate the engagement element and the handle;
    wherein the handle assembly rotates about a second axis of rotation transverse to the first axis of rotation between a first position and a second position, wherein the engagement element disengages the cam surface in the first position and the engagement element engages the cam surface in the second position.

2. A tensioner according to claim 1, wherein the handle is threadably mounted to the tension bar.

3. A tensioner according to claim 1, wherein the engagement element comprises a washer mounted around the tension bar.

4. A tensioner according to claim 1, wherein the handle assembly extends beyond a planar surface of the base in the first position and the handle assembly extends substantially transverse to the planar surface of the base in the second position.

5. A tensioner according to claim 4, further comprising a step on the tension bar, the engagement element being supported on the step in the first position.

6. A tensioner according to claim 4, wherein the handle assembly passes through a toggle point when moved to the first position.

7. A tensioner according to claim 4, wherein the handle assembly passes through a toggle point about 3 degrees past the plane of the planar surface of the base when moved to the first position.

8. A tensioner according to claim 1, further comprising a tab on the base and a complementary notch on the handle, and wherein the handle is adjustable to align the notch with the tab.

9. A tensioner according to claim 1, wherein the idler comprises a pulley.

10. A tensioner according to claim 1, wherein the idler comprises a sprocket.

11. A tensioner according to claim 1, wherein cam surface comprises an arc extending substantially parallel to a plane of the base at an upper end and substantially transverse to the plane of the base at a lower end, and wherein the arc extends in a plane substantially parallel to the first axis of rotation.

12. A tensioner according to claim 1, wherein tension bar includes a lower cross-member acting as a hinge pin on the base extending transversely to the first axis of rotation and the idler support assembly includes a slot receiving the cross member.

13. A tensioner according to claim 1, wherein cam surface comprises a shoulder defining a recess and wherein the engagement element is positioned in the recess in the locked position.

* * * * *